United States Patent [19]

Maddocks

[11] 3,744,715
[45] July 10, 1973

[54] PRESSURE OPERATED TEMPERATURE SENSOR ACTUATOR

[75] Inventor: Gerald E. Maddocks, Chatham, Ontario, Canada

[73] Assignee: Fram Corporation, East Providence, R.I.

[22] Filed: Feb. 23, 1972

[21] Appl. No.: 228,655

[52] U.S. Cl............................ 236/13, 236/87, 251/38, 123/122 H
[51] Int. Cl............................................. F02m 31/06
[58] Field of Search........................ 236/101, 87, 13; 251/38; 91/419; 123/122 H

[56] References Cited
UNITED STATES PATENTS 3,459,163  8/1969  Lewis.................................. 236/13
2,142,665  1/1939  Brett et al........................... 236/13

Primary Examiner—William E. Wayner
Attorney—Robert E. Hillman

[57] ABSTRACT

Improvement in a system for controlling fluid temperature comprising a member movable between positions in which the temperature is respectively increased and decreased, and an actuator linked to the member and mounted to communicate with the fluid to adjust the position of the member in accordance with temperature changes in the fluid, the improvement being in the actuator, which comprises a housing; a diaphragm mounted in the housing to define a control chamber therein, the diaphragm having a valving portion and having a piston portion linked to the member and mounted to reciprocate in the housing, to move the member between its positions, the housing having an opening on one side of the diaphragm for connection to a source of regulating pressure, the valving portion being adjacent the opening and movable between sealed and unsealed positions with respect thereto; and a temperature sensitive element mounted to apply force to the valving portion dependent upon the fluid temperature, so that the balance of forces on the valving portion, including force attributable to the regulating pressure, will determine the position of the valving portion, and, in turn, the pressure in the chamber and the positions of the piston portion and the member.

9 Claims, 2 Drawing Figures

PATENTED JUL 10 1973  3,744,715

3,744,715

PRESSURE OPERATED TEMPERATURE SENSOR ACTUATOR

BACKGROUND OF THE INVENTION

1. Field of the Invention

This invention relates to controlling fluid temperature, e.g. in an air stream supplied to the carburetor for an automotive engine.

2. Description of the Prior Art

Various systems have been devised in which a temperature sensitive device positioned in an air stream is responsive to temperature changes in the stream to vary the proportions of hot and cold air drawn from respective inlets to the stream, e.g. as shown in U.S. Pat. No. 3,513,817.

SUMMARY OF THE INVENTION

The invention, in its various aspects, provides a control system that is highly responsive to temperature changes in the air stream, can be easily and accurately calibrated, is simple and economical (e.g., requiring, in the preferred embodiment, relatively little bimetallic material to achieve the desired temperature sensitivity), and provides improved mixing of the hot and cold air streams.

In general the invention features, in a system for controlling fluid temperature comprising a member movable between positions in which the temperature is respectively increased and decreased, and an actuator linked to the member and mounted to communicate with the fluid to adjust the position of the member in accordance with temperature changes in the fluid, that improvement wherein the actuator comprises a housing; a diaphragm mounted in the housing to define a control chamber therein, the diaphragm having a valving portion and having a piston portion linked to the member and mounted to reciprocate in the housing, to move the member between its positions, the housing having an opening on one side of the diaphragm for connection to a source of regulating pressure, the valving portion being adjacent the opening and movable between sealed and unsealed positions with respect thereto; and a temperature sensitive element mounted to apply force to the valving portion dependent upon the fluid temperature, so that the balance of forces on the valving portion, including force attributable to the regulating pressure, will determine the position of the valving portion and, in turn, the pressure in the chamber and the positions of the piston portion and the member. In preferred embodiments the piston portion of the diaphragm is sandwiched between a pair of more rigid elements, the member is a pivoted valving door in a branched conduit, the door in its positions respectively blocking branches of the conduit, and the door and one of the elements are linked by a first class lever; the valving portion is a tongue of the diaphragm extending into a cup-like extension of the housing communicating with the control chamber; the tongue has a knob extending away from the chamber and connected to a bimetallic strip fixed to the housing and comprising the temperature sensitive element; a tube extends into the extension to a position adjacent the tongue, for supply of the regulating pressure; the housing has a bleed opening for the control chamber; the system is mounted in an air supply conduit for the carburetor of an automotive engine; the conduit includes a hot air inlet branch extending through a wall thereof along an axis oblique to the axis of the conduit and substantially into the interior of the conduit to improve mixture of hot air with the main stream through the conduit; and an adjustment screw extends between the bimetallic strip and the housing to regulate the force applied by the strip to the tongue.

Other features and advantages of the invention will be apparent from the description and drawings herein of a preferred embodiment thereof.

DESCRIPTION OF THE PREFERRED EMBODIMENT

Figure 1:
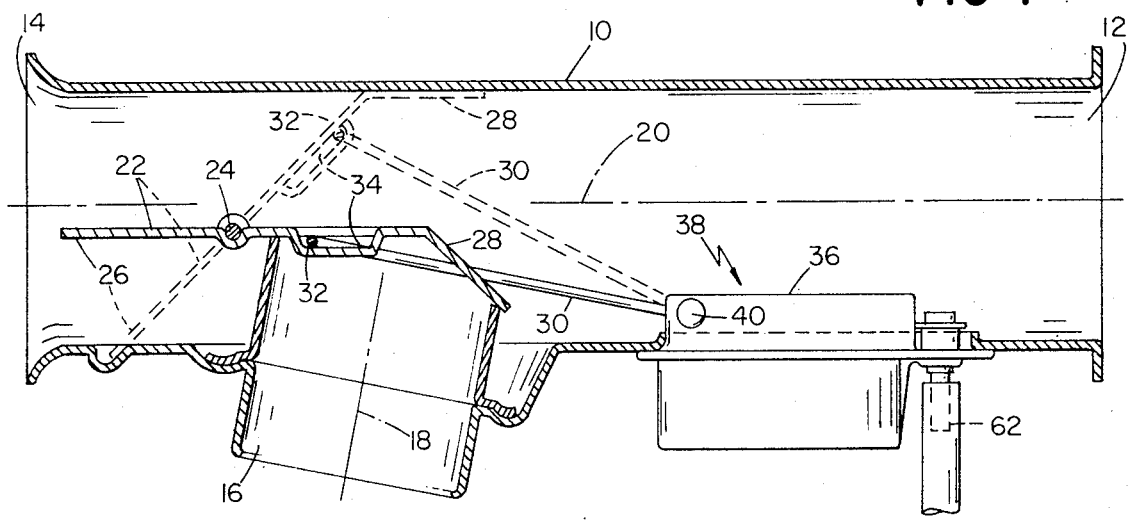
FIG. 1 is a somewhat schematic sectional view of an air inlet conduit for the carburetor of an automotive engine.

Referring to the drawings, conduit 10 is adapted for connection at outlet 12 to a conventional automotive air cleaner (not shown), and has a cold air inlet 14 in communication with the atmosphere and a hot air inlet branch conduit 16 arranged for connection to a source of heated air for injection into the cold air stream along an axis 18 oblique to axis 20 of the main conduit. Conduit 16 extends substantially into conduit 10, to inject hot air into the middle of the cold air stream, thereby enhancing the mixture.

Figure 2:
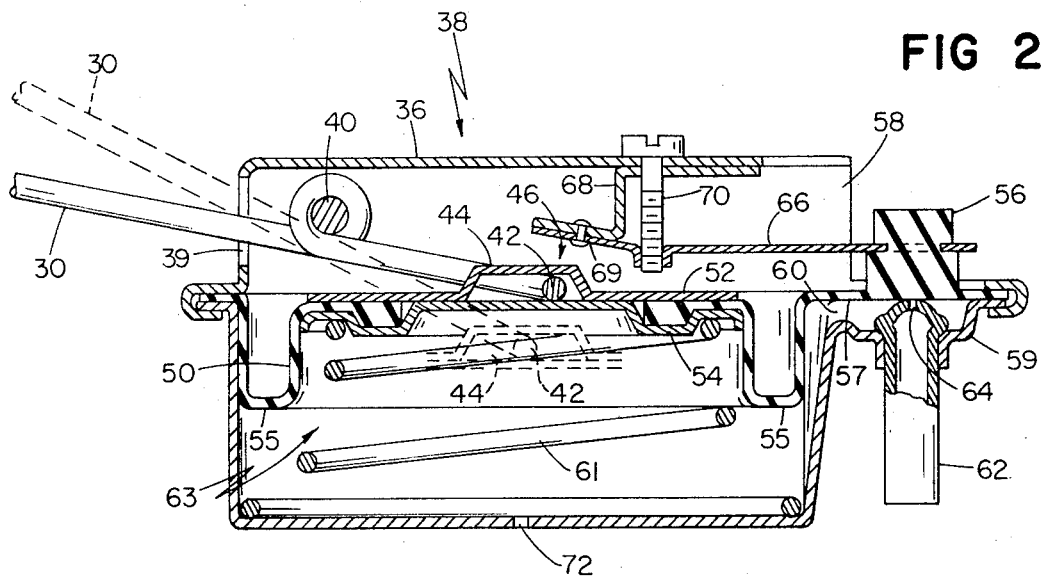
FIG. 2 is a somewhat schematic sectional view of the temperature sensing and valve actuating device shown as part of FIG. 1.

Valve door 22 is pivoted on pin 24, has a major portion 26 which blocks flow from inlet 14 in one valve position (dashed lines, FIG. 1), and has a minor portion 28 forming an angle of 120° with portion 26 and acting with part of portion 26 to block flow from inlet 16 in another valve position (solid lines, FIG. 1). First class actuating lever 30 is connected at one end to door 22 through a sliding pivot 32 in channel 34 of the door, extends into housing 36 of temperature sensing and valve actuating device 38 through slot 39 (FIG. 2), is itself pivoted on pin 40 inside housing 36, and has its other end 42 slidingly pivoted in channel 44 of piston 46.

Flexible diaphragm 50 is sandwiched between metal plates 52 and 54 which form piston 46, has an annular portion 55 of U-shaped cross-section surrounding the full 360° circumference of piston 46, and, at one end, a regulating tongue 57 with an upwardly protruding knob 56 adjacent an opening 58 into housing 36 above the diaphragm. The diaphragm is sealed at its periphery between the upper and lower portions of housing 36. Housing 38 is formed in a cup 59 below knob 56. The cup communicates through an opening 60 with the housing interior below piston 46 which constitutes a control chamber 63. Spring 61 in chamber 63 acts between the floor of housing 36 and piston 46 to bias the piston upwardly. Device 38 is mounted in a wall of conduit 10 downstream of inlets 14 and 16, with opening 58 (and hence the upper surfaces of piston 46 and diaphragm 50) in communication with the interior of the conduit.

Tube 62 is connected to the engine manifold (not shown, a source of sub-atmospheric regulating pressure), extends into cup 39 of housing 38 below and aligned with diaphragm knob 56, and has a small opening 64 adjacent the undersurface of diaphragm 50.

Bimetallic strip 66 is mounted at one end on knob 56 and extends into housing 36 through opening 58.

Bracket 68, attached to the top of housing 36, is riveted at 69 to the other end of strip 66. Adjustment screw 70 extends through the top of housing 36 and is threaded into strip 66, to regulate the upward force exerted by the strip upon diaphragm knob 56.

Bleed orifice 72 is provided at the bottom of chamber 63 in the floor of housing 36.

In operation, with regulating tongue 57 against opening 64 to block communication between the engine manifold and chamber 63, the force of strip 66 on knob 56 is balanced by the combination of pneumatic forces on the tongue (atmospheric pressure acting against the full upper surface, manifold pressure acting through opening 64 against a small portion of the undersurface, and the pressure in chamber 63 acting through opening 60 against the rest of the undersurface). In this condition spring 61 holds piston 46 in its uppermost position so that lever 30 is pivoted counterclockwise (as seen in FIG. 1) and holds valve door 22 over inlet branch 16 to block entry of hot air. Should the temperature of air flowing through conduit 10 decrease, the force exerted by strip 66 on knob 56 will increase, until the tongue is drawn away from opening 64, causing the pressure in chamber 63 to drop. That drop in pressure increases the downward force on piston 46 opposing spring 61, tending to draw the piston down, pivot lever 30 clockwise, and move valve door 22 toward inlet 14 and away from inlet 16, thus allowing some hot air to be injected into the stream. At the same time, the reduction in pressure below the diaphragm increases the net downward pneumatic force on regulating tongue 57, opposing the increased upward force exerted by strip 66, tending to return the tongue to its position blocking opening 64. As a result, the pressure in chamber 63, and hence the positions of piston 46 and door 22, are generally proportional to the force developed in the bimetallic strip 66 (rather than to the deflection of the strip), giving excellent, accurately calibrated (with screw 70) temperature response with a minimum amount of bimetal (since force in bimetallic material is proportional to the cube of its thickness, whereas deflection is linear with thickness). Bleed orifice 72 keeps the system dynamic, and its location remote from the regulating tongue and opening 64 avoids contamination of the most sensitive parts of the system.

Strip 66 enters into force balance only with pressures exerted against regulating tongue 57.

The use of a single diaphragm to both transmit and regulate actuating pressure, and the use of a single tube 62 as a source of actuating pressure, provide simplicity and economy.

Other embodiments are within the following claims.

What is claimed is:

1. In a system for controlling fluid temperature comprising a member movable between positions in which said temperature is respectively increased and decreased, and an actuator linked to said member and mounted to communicate with said fluid to adjust the position of said member in accordance with temperature changes in said fluid, that improvement wherein said actuator comprises
   a housing,
   a diaphragm mounted in said housing to define a control chamber therein,
   said diaphragm having a valving portion and having a piston portion linked to said member and mounted to reciprocate in said housing, to move said member between said positions,
   said housing having an opening on one side of said diaphragm for connection to a source of regulating pressure,
   said valving portion being adjacent said opening and movable between sealed and unsealed positions with respect thereto, and
   a temperature sensitive element mounted to apply force to said valving portion dependent upon said fluid temperature, so that the balance of forces on said valving portion, including force attributable to said regulating pressure, will determine the position of said valving portion and, in turn, the pressure in said chamber and the positions of said piston portion and said member.

2. The system of claim 1 wherein said piston portion of said diaphragm is sandwiched between a pair of more rigid elements, said member is a pivoted valving door in a branched conduit, said door in its said positions respectively blocking branches of said conduit, and said door and one of said elements are linked by a first class lever.

3. The system of claim 1 wherein said valving portion is a tongue of said diaphragm extending into a cup-like extension of said housing communicating with said control chamber.

4. The system of claim 3 wherein said tongue has a knob extending away from said chamber and connected to a bimetallic strip fixed to said housing and comprising said temperature sensitive element.

5. The system of claim 3 wherein a tube extends into said extension to a position adjacent said tongue, for supply of said regulating pressure.

6. The system of claim 1 wherein said housing has a bleed opening for said control chamber.

7. The system of claim 1 wherein said temperature sensitive element is a bimetallic strip connected between said housing and said valving portion of said diaphragm, and an adjustment screw extends between said strip and said housing to regulate the force applied by said strip to said valving portion.

8. The system of claim 1 in an automotive engine air supply conduit.

9. The system of claim 8 wherein said conduit includes a hot air inlet branch extending through a wall thereof along an axis oblique to the axis of said conduit and substantially into the interior of said conduit to improve mixture of hot air with the main stream through said conduit.

* * * * *